US008240700B2

(12) United States Patent
Greger et al.

(10) Patent No.: US 8,240,700 B2
(45) Date of Patent: Aug. 14, 2012

(54) STROLLER WITH TRAVEL SEAT ATTACHMENT

(75) Inventors: Jeff Greger, Lititz, PA (US); Michael Longenecker, Lancaster, PA (US)

(73) Assignee: Artsana USA, Inc., Lancaster, PA (US)

( * ) Notice: Subject to any disclaimer, the term of this patent is extended or adjusted under 35 U.S.C. 154(b) by 175 days.

(21) Appl. No.: 12/729,663

(22) Filed: Mar. 23, 2010

(65) Prior Publication Data

US 2010/0171289 A1    Jul. 8, 2010

Related U.S. Application Data

(63) Continuation-in-part of application No. 12/541,622, filed on Aug. 14, 2009.

(60) Provisional application No. 61/089,249, filed on Aug. 15, 2008.

(51) Int. Cl.
 *B62B 7/14* (2006.01)
(52) U.S. Cl. ...................................................... 280/648
(58) Field of Classification Search ............. 280/33.993, 280/47.38, 639, 642, 643, 644, 647, 648, 280/649, 650, 658
See application file for complete search history.

(56) References Cited

U.S. PATENT DOCUMENTS

| | | | |
|---|---|---|---|
| 1,598,778 A | 5/1923 | Leake | |
| 1,709,527 A | 4/1929 | Ford | |
| 2,616,719 A | 11/1952 | Heideman | |
| 2,783,053 A | 2/1957 | Sheldrick et al. | |
| 3,112,042 A | 11/1963 | Leshner | |
| 3,168,330 A | 2/1965 | Smith et al. | |
| 3,227,484 A | 1/1966 | Merclean | |
| 3,390,893 A | 7/1968 | MacLaren | |
| 3,459,435 A | 8/1969 | Garner | |
| 3,504,926 A | 4/1970 | Glaser | |
| 3,556,546 A | 1/1971 | Garner | |
| 3,561,787 A | 2/1971 | Toda et al. | |
| 3,653,681 A | 4/1972 | Virtue | |
| 3,799,567 A | 3/1974 | Toda | |
| 3,989,295 A | 11/1976 | Sparkes | |

(Continued)

FOREIGN PATENT DOCUMENTS

BE    818905    12/1974

(Continued)

OTHER PUBLICATIONS

Evenflo® Easy Comfort Premier™ Stroller (1999).

(Continued)

*Primary Examiner* — John Walters
*Assistant Examiner* — James Triggs
(74) *Attorney, Agent, or Firm* — Volpe and Koenig, P.C.

(57) ABSTRACT

The stroller includes a frame having at least one front leg, at least one rear leg, and at least one wheel mounted on each leg. The frame defines front and rear portions and right and left sides. The stroller also includes a seat having a seat base and a seat back pivotally mounted to the frame. The seat back has a front surface, a rear surface, a top portion and a bottom portion and is rotatable relative to the frame between at least one substantially upright or reclined back support position and a travel seat support position wherein the top portion of the seat back extends towards the front portion of the frame and is capable of supporting a travel seat thereon.

24 Claims, 8 Drawing Sheets

U.S. PATENT DOCUMENTS

| | | | |
|---|---|---|---|
| 4,007,947 A | 2/1977 | Perego | |
| 4,023,825 A | 5/1977 | Kassai | |
| 4,046,401 A | 9/1977 | Kassai | |
| 4,111,454 A | 9/1978 | Kassai | |
| 4,126,331 A | 11/1978 | Sloan et al. | |
| 4,191,397 A | 3/1980 | Kassai | |
| 4,232,897 A | 11/1980 | Maclaren et al. | |
| 4,248,443 A | 2/1981 | Ohlson | |
| 4,317,581 A | 3/1982 | Kassai | |
| 4,322,093 A | 3/1982 | Otto | |
| 4,335,900 A | 6/1982 | Fleischer | |
| 4,362,315 A | 12/1982 | Kassai | |
| 4,365,819 A | 12/1982 | Bart | |
| 4,378,946 A | 4/1983 | Voytko et al. | |
| 4,412,688 A | 11/1983 | Giordani | |
| 4,415,180 A | 11/1983 | Payne, Jr. | |
| 4,513,974 A | 4/1985 | Lin | |
| 4,542,915 A | 9/1985 | Wheeler, III et al. | |
| 4,564,212 A | 1/1986 | Orlandino et al. | |
| 4,591,176 A | 5/1986 | Kassai | |
| 4,602,395 A | 7/1986 | Kassai | |
| 4,606,550 A | 8/1986 | Cone | |
| 4,610,460 A | 9/1986 | Kassai | |
| 4,632,420 A | 12/1986 | Miyagi | |
| 4,632,421 A | 12/1986 | Shamie | |
| 4,660,850 A | 4/1987 | Nakao et al. | |
| 4,706,986 A | 11/1987 | Kassai | |
| 4,733,882 A | 3/1988 | Kassai | |
| 4,741,056 A | 5/1988 | Kassai | |
| 4,741,551 A | 5/1988 | Perego | |
| 4,763,911 A | 8/1988 | Gebhard et al. | |
| 4,763,919 A | 8/1988 | Nakao et al. | |
| 4,768,795 A | 9/1988 | Mar | |
| 4,770,437 A | 9/1988 | Glaser | |
| 4,805,928 A | 2/1989 | Nakao et al. | |
| 4,807,928 A | 2/1989 | Cone | |
| 4,817,982 A | 4/1989 | Kassai | |
| 4,819,958 A | 4/1989 | Perego | |
| 4,832,361 A | 5/1989 | Nakao et al. | |
| 4,856,809 A | 8/1989 | Kohus et al. | |
| 4,886,289 A | 12/1989 | Yee et al. | |
| 4,892,327 A | 1/1990 | Cabagnero | |
| 4,906,017 A | 3/1990 | Kassai | |
| 4,907,818 A | 3/1990 | Chai | |
| 4,924,725 A | 5/1990 | Takahashi et al. | |
| D308,656 S | 6/1990 | Takahashi et al. | |
| 4,930,697 A | 6/1990 | Takahashi et al. | |
| D310,645 S | 9/1990 | Julien | |
| 4,953,887 A | 9/1990 | Takahashi et al. | |
| 4,968,092 A | 11/1990 | Giambrone | |
| D317,280 S | 6/1991 | Takahashi et al. | |
| 5,028,061 A | 7/1991 | Hawkes | |
| D320,370 S | 10/1991 | Takahashi et al. | |
| 5,056,805 A | 10/1991 | Wang | |
| 5,074,575 A | 12/1991 | Bigo | |
| 5,087,066 A | 2/1992 | Mong-Hsing | |
| 5,110,150 A | 5/1992 | Chen | |
| 5,143,398 A | 9/1992 | Teng | |
| 5,181,735 A | 1/1993 | Onishi | |
| 5,184,835 A | 2/1993 | Huang | |
| 5,201,535 A | 4/1993 | Kato et al. | |
| 5,205,577 A | 4/1993 | Liu | |
| 5,205,579 A | 4/1993 | Kato et al. | |
| D337,257 S | 7/1993 | Danieli | |
| 5,238,292 A | 8/1993 | Golenz et al. | |
| 5,244,228 A | 9/1993 | Chiu | |
| 5,246,272 A | 9/1993 | Kato et al. | |
| 5,257,799 A | 11/1993 | Cone et al. | |
| D352,017 S | 11/1994 | Kaneko | |
| 5,362,089 A | 11/1994 | Jyan-Tsai | |
| 5,388,852 A | 2/1995 | Bigo et al. | |
| 5,398,951 A | 3/1995 | Ryu | |
| D357,439 S | 4/1995 | Haut et al. | |
| D357,440 S | 4/1995 | Pietra | |
| 5,417,449 A | 5/1995 | Shamie | |
| 5,417,450 A | 5/1995 | Wang | |
| 5,427,402 A | 6/1995 | Huang | |
| 5,431,478 A | 7/1995 | Noonan | |
| 5,437,493 A | 8/1995 | Weisleder | |
| 5,441,163 A | 8/1995 | Carrasco | |
| 5,454,584 A | 10/1995 | Haut et al. | |
| 5,460,395 A | 10/1995 | Chen | |
| 5,460,398 A | 10/1995 | Huang | |
| 5,472,224 A | 12/1995 | Cabagnero | |
| 5,478,102 A | 12/1995 | Haung | |
| 5,489,138 A | 2/1996 | Mariol et al. | |
| 5,511,259 A | 4/1996 | Tarara | |
| 5,511,441 A | 4/1996 | Arai | |
| 5,524,503 A | 6/1996 | Ishikura | |
| 5,527,090 A | 6/1996 | Cone, II | |
| 5,605,409 A | 2/1997 | Haut et al. | |
| 5,622,377 A | 4/1997 | Shamie | |
| 5,645,293 A | 7/1997 | Cheng | |
| 5,649,737 A | 7/1997 | Behnke | |
| 5,664,795 A | 9/1997 | Haung | |
| 5,669,623 A | 9/1997 | Onishi | |
| 5,669,624 A | 9/1997 | Eichhorn | |
| 5,669,625 A | 9/1997 | Jane Cabagnero | |
| 5,676,386 A | 10/1997 | Huang | |
| 5,718,444 A | 2/1998 | Huang | |
| 5,722,682 A | 3/1998 | Wang | |
| 5,727,798 A | 3/1998 | Walters et al. | |
| 5,741,021 A | 4/1998 | Saint et al. | |
| 5,752,738 A | 5/1998 | Onishi et al. | |
| 5,765,855 A | 6/1998 | Chiu | |
| 5,765,856 A | 6/1998 | Kiser | |
| 5,769,447 A | 6/1998 | Huang | |
| 5,772,235 A | 6/1998 | Espenshade | |
| 5,775,718 A | 7/1998 | Huang | |
| 5,795,091 A | 8/1998 | Kakuda et al. | |
| 5,810,432 A | 9/1998 | Haut et al. | |
| 5,845,666 A | 12/1998 | Messner | |
| 5,845,924 A | 12/1998 | Huang | |
| 5,876,057 A | 3/1999 | Huang | |
| 5,887,935 A | 3/1999 | Sack | |
| D412,142 S | 7/1999 | Dickie | |
| 5,921,571 A | 7/1999 | Bell | |
| 5,934,757 A | 8/1999 | Smith | |
| 5,938,229 A | 8/1999 | Chen et al. | |
| 5,947,555 A | 9/1999 | Welsh, Jr. et al. | |
| D415,075 S | 10/1999 | Lan | |
| 5,979,928 A | 11/1999 | Kuo | |
| 5,984,332 A | 11/1999 | Beaudoin et al. | |
| 5,988,669 A | 11/1999 | Freese et al. | |
| 5,988,670 A | 11/1999 | Song et al. | |
| D419,113 S | 1/2000 | Everett | |
| D421,940 S | 3/2000 | Gibson et al. | |
| 6,068,284 A | 5/2000 | Kakuda | |
| 6,070,890 A | 6/2000 | Haut et al. | |
| D427,822 S | 7/2000 | Greger | |
| 6,099,022 A | 8/2000 | Pring | |
| 6,102,431 A | 8/2000 | Sutherland et al. | |
| D431,212 S | 9/2000 | Haung | |
| D431,213 S | 9/2000 | Yang | |
| 6,116,624 A | 9/2000 | Hu | |
| 6,129,373 A | 10/2000 | Cheng | |
| 6,139,046 A | 10/2000 | Aalund et al. | |
| 6,152,476 A | 11/2000 | Huang | |
| 6,155,740 A | 12/2000 | Hartenstine | |
| 6,189,914 B1 | 2/2001 | Worth et al. | |
| 6,193,263 B1 | 2/2001 | Lin | |
| 6,209,829 B1 | 4/2001 | Yu | |
| 6,273,451 B1 | 8/2001 | Julien et al. | |
| 6,286,844 B1 | 9/2001 | Cone, II et al. | |
| 6,296,004 B1 | 10/2001 | Gordon | |
| 6,299,194 B1 | 10/2001 | Chen | |
| 6,302,613 B1 | 10/2001 | Lan | |
| D452,192 S | 12/2001 | Hartenstine et al. | |
| 6,339,862 B1 | 1/2002 | Cheng | |
| 6,368,006 B1 | 4/2002 | Yang et al. | |
| 6,398,233 B1 | 6/2002 | Liang et al. | |
| 6,409,205 B1 | 6/2002 | Bapst et al. | |
| 6,412,809 B1 | 7/2002 | Bigo et al. | |
| 6,443,261 B1 | 9/2002 | Gibson et al. | |
| 6,443,479 B2 | 9/2002 | Huang | |
| 6,446,990 B1 | 9/2002 | Nania et al. | |
| 6,467,739 B1 | 10/2002 | Jou | |

| | | | |
|---|---|---|---|
| 6,478,327 B1 | 11/2002 | Hartenstine et al. | |
| D470,803 S | 2/2003 | Hansen | |
| D473,663 S | 4/2003 | Chou | |
| 6,557,871 B2 | 5/2003 | Hsia | |
| 6,557,885 B1 | 5/2003 | Kakuda | |
| 6,572,134 B2 | 6/2003 | Barrett et al. | |
| 6,581,957 B1 | 6/2003 | Lan | |
| D480,195 S | 9/2003 | Koerlin et al. | |
| 6,666,473 B2 | 12/2003 | Hartenstine et al. | |
| D494,511 S | 8/2004 | Chen | |
| 6,851,700 B2 | 2/2005 | Yoshie et al. | |
| 7,017,921 B2 | 3/2006 | Eros | |
| 7,017,937 B2 | 3/2006 | Williams | |
| 7,032,922 B1 | 4/2006 | Lan | |
| D521,422 S | 5/2006 | Williams | |
| 7,044,497 B2 | 5/2006 | Hartenstine et al. | |
| 7,185,909 B2 | 3/2007 | Espenshade et al. | |
| 7,188,858 B2 | 3/2007 | Hartenstine et al. | |
| D545,074 S | 6/2007 | Loew et al. | |
| 7,281,732 B2 | 10/2007 | Fox et al. | |
| D558,648 S | 1/2008 | Feyler et al. | |
| 7,338,122 B2 | 3/2008 | Hei et al. | |
| D566,629 S | 4/2008 | Taylor | |
| 7,445,229 B2 | 11/2008 | Dotsey et al. | |
| 7,445,230 B2 | 11/2008 | Kassai et al. | |
| D593,272 S | 5/2009 | Hailston | |
| D604,151 S | 11/2009 | Kollman et al. | |
| 7,621,431 B2 | 11/2009 | Williams | |
| 7,686,322 B2 | 3/2010 | Longenecker et al. | |
| D617,255 S | 6/2010 | Tezak et al. | |
| D630,934 S | 1/2011 | Kollman et al. | |
| 7,871,100 B2 | 1/2011 | Chen et al. | |
| D636,300 S | 4/2011 | Greger et al. | |
| 2005/0012306 A1 | 1/2005 | Lan | |
| 2005/0242549 A1 | 11/2005 | Longenecker et al. | |
| 2006/0001226 A1 | 1/2006 | Refsum | |
| 2006/0131840 A1 | 6/2006 | Donay | |
| 2006/0131841 A1 | 6/2006 | Huang | |
| 2006/0152059 A1 | 7/2006 | Refsum | |
| 2006/0157945 A1 | 7/2006 | Refsum | |
| 2006/0219374 A1 | 10/2006 | McKinney | |
| 2006/0261576 A1 | 11/2006 | Dotsey et al. | |
| 2009/0127827 A1* | 5/2009 | Pike et al. ............ 280/648 | |
| 2009/0127828 A1 | 5/2009 | Longenecker et al. | |
| 2009/0243260 A1 | 10/2009 | Longenecker et al. | |
| 2010/0038886 A1 | 2/2010 | Greger et al. | |

FOREIGN PATENT DOCUMENTS

| | | |
|---|---|---|
| DE | 34 07 241 | 2/1984 |
| DE | 35 25 834 | 7/1985 |
| DE | 38 30 752 | 9/1988 |
| DE | 40 22 391 | 7/1990 |
| DE | 42 29 857 | 9/1992 |
| DE | 195 43 273 | 11/1995 |
| DE | 196 15 901 | 4/1996 |
| DE | 196 38 097 | 9/1996 |
| DE | 198 33 857 | 7/1997 |
| DE | 198 33 115 | 7/1998 |
| DE | 299 00 901 | 1/1999 |
| DE | 200 01 964 | 4/2000 |
| DE | 200 02 027 | 4/2000 |
| DE | 203 11 781 | 10/2003 |
| EP | 0 422 812 | 10/1990 |
| EP | 0 639 489 | 8/1994 |
| EP | 0 719 693 | 11/1995 |
| EP | 0 897 848 | 8/1998 |
| EP | 0 901 953 | 3/1999 |
| EP | 0 997 367 | 8/1999 |
| EP | 0 994 004 | 4/2000 |
| EP | 1 153 817 | 11/2001 |
| EP | 1 170 193 | 1/2002 |
| EP | 1 160 145 | 12/2004 |
| EP | 1 666 331 | 6/2006 |
| EP | 1 591 339 | 12/2008 |
| ES | 2 016 525 | 8/1989 |
| ES | 2 069 458 | 9/1992 |
| FR | 2 089 832 | 4/1971 |
| FR | 2 244 348 | 9/1973 |
| FR | 2 267 918 | 4/1974 |
| FR | 2 257 482 | 1/1975 |
| FR | 2 323 563 | 9/1975 |
| FR | 2 667 512 | 10/1990 |
| FR | 2 767 509 | 8/1998 |
| GB | 0 690 115 | 5/1950 |
| GB | 1 176 516 | 7/1967 |
| GB | 1 394 564 | 12/1973 |
| GB | 1 510 312 | 9/1974 |
| GB | 1 561 594 | 10/1976 |
| GB | 2 124 556 | 6/1982 |
| GB | 2 186 793 | 2/1987 |
| GB | 2 197 784 | 6/1988 |
| GB | 2 225 557 | 12/1988 |
| GB | 2 244 029 | 3/1990 |
| GB | 2 268 394 | 5/1992 |
| GB | 2 251 830 | 7/1992 |
| GB | 2 318 099 | 10/1996 |
| GB | 2 324 510 | 3/1998 |
| GB | 2 342 897 | 10/1999 |
| IT | 1233953 | 1/1989 |
| JP | 10-35506 | 2/1989 |
| JP | 10-35506 | 2/1989 |
| JP | 10-35506 | 2/1989 |
| JP | 10-35506 | 2/1998 |
| NL | 1009312 | 6/1998 |
| PT | 84257 | 2/1987 |
| SU | 1156949 | 4/1983 |
| WO | 88/02714 | 4/1988 |
| WO | 93/07039 | 4/1993 |
| WO | 99/50123 | 10/1999 |
| WO | 00/06437 | 2/2000 |
| WO | 01/28840 | 4/2001 |
| WO | 2009/065129 | 5/2009 |

OTHER PUBLICATIONS

Evenflo® Light & Easy™ Stroller (1999).
Evenflo® Easy Comfort Classic™ Travel System (1999).
Evenflo® Easy Comfort Plus™ Travel System (1999).
Evenflo® Easy Comfort Premier™ Travel System (1999).
Jane® Twin Two Stroller (printed May 5, 2010).
Evenflo® Light & Easy™ Stroller (1999)

* cited by examiner

STROLLER WITH TRAVEL SEAT ATTACHMENT

CROSS REFERENCE TO RELATED APPLICATION

This application is a continuation-in-part of U.S. patent application Ser. No. 12/541,622, which claims the benefit of U.S. Provisional Patent App. No. 61/089,249, both of which are incorporated herein by reference herein as if fully set forth.

FIELD OF INVENTION

The present application relates generally to the field of child strollers. More particularly, the present application relates to a stroller having an improved mechanism for mounting a child travel seat.

BACKGROUND

Particularly, with infants, it is desirable to design a stroller that can secure a travel seat, such as an infant car seat carrier, so that the travel seat can be mounted between a car seat base and the stroller without having to remove the infant from the travel seat. Examples of strollers that can accommodate such a travel seat are disclosed in U.S. Patent Pub. No. 2005/0242549 or U.S. Pat. No. 7,597,396, which are incorporated herein by reference as if fully set forth.

Strollers designed for mounting travel seats thereto are often larger and heavier than those that do not support travel seats, due to the need for additional structures for securing the travel seat thereon. In some known strollers designed for mounting of travel seats, the travel seat is configured for mounting between the seat back and a child tray that extends in front of the seat. Other known strollers include attachments that must be affixed to the stroller in order to mount a child seat thereto. A need exists for a stroller that allows mounting of a travel seat with a more compact design and does not require structures such as a child tray or removable attachment device to support the travel seat.

SUMMARY

The present invention is directed to a stroller having a frame that includes at least one front leg, at least one rear leg, and at least one wheel mounted on each leg. The frame defines front and rear portions and right and left sides. At least one travel seat mount is affixed to the front leg. The stroller also includes a seat having a seat base and a seat back pivotally mounted to the frame. The seat back has a front surface and a rear surface and is rotatable relative to the frame between at least one substantially upright or reclined back support position and a travel seat support position wherein the top portion of the seat back extends towards the front portion of the frame and is capable of supporting a travel seat thereon.

The present invention is further directed to a stroller having a frame including at least one front leg, at least one rear leg, and at least one wheel mounted on each leg. The frame defines front and rear portions and right and left sides. The stroller further includes a seat having a seat base and a seat back pivotally mounted to the frame. The seat back has a front surface and a rear surface, and at least one front travel seat mount is affixed to the rear surface of the seat back. The seat back is rotatable relative to the frame between at least one back support position and a travel seat support position wherein the at least one front travel seat mount is positioned forward of the at least one front leg such that the stroller is capable of supporting a travel seat between the at least one travel seat mount and the at least one front leg.

The present invention is still further directed to a travel system, including a travel seat and a stroller. The stroller includes a frame having at least one front leg, at least one rear leg, and at least one wheel mounted on each leg. The frame defines front and rear portions and right and left sides. A seat is mounted to the frame and includes a seat base and a seat back that pivots with respect to the seat base and has a front surface and a rear surface. At least one travel seat mount is affixed to the frame or the seat back. The travel system converts between a child seating configuration in which the seat back is in a back support position, and a travel seat supporting configuration in which the seat back is pivoted to a position extending towards the front portion of the frame and the child seat is supportable between the seat back and the at least one front leg.

BRIEF DESCRIPTION OF THE DRAWINGS

The present invention will be better understood when read in conjunction with the following detailed description of the preferred embodiments of the invention and the appended drawings. In the drawings.

DETAILED DESCRIPTION OF THE PREFERRED EMBODIMENT

Figure 1:
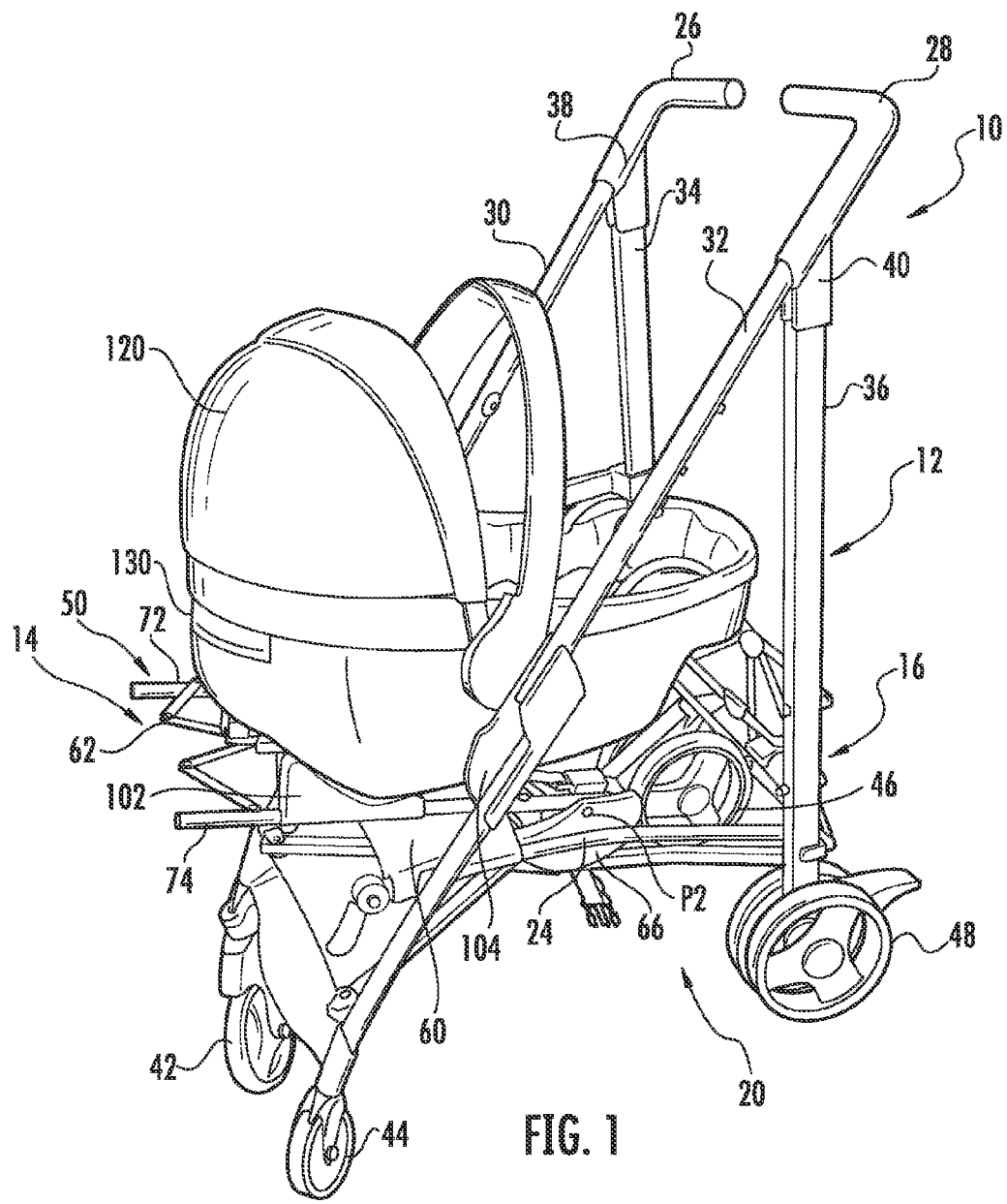
FIG. 1 is a perspective view of a preferred embodiment of the stroller with a travel seat mounted thereon.

Certain terminology is used in the following description for convenience only and is not considered limiting. Words such as "front," "back," "top," and "bottom" designate directions in the drawings to which reference is made. This terminology includes the words specifically noted above, derivatives thereof, and words of similar import. Additionally, the terms "a" and "one" are defined as including one or more of the referenced item unless specifically noted. The phrase "at least one of" followed by a list of two or more items, such as "A, B or C," means any individual one of A, B or C, as well as any combination thereof.

As used hereinafter in the description and claims, the term "substantially upright" is defined as vertical, or oriented to form only a small angle with respect to the vertical direction (i.e., less than 20°).

With reference to drawing FIGS. 1-8, wherein like numerals indicate like elements throughout, preferred embodiments of the invention will be described in more detail below.

The stroller 10 of the present invention generally includes a frame 12. The stroller frame 12 preferably has a front end 14, a rear end 16, and left and right sides 18, 20. The frame 12 has left and right front legs 30, 32 and left and right rear legs 34, 36. In the preferred embodiment shown, the rear legs 34, 36 are substantially vertical or perpendicular to the ground and the front legs 30, 32 are arranged at an angle with respect to the rear legs 34, 36. The front legs 30, 32 are connected to the rear legs 34, 36 at respective left and right upper joints 38, 40. A left link 22 extends between the left front leg 30 and the left rear leg 34, and a right link 24 extends between the right front leg 32 and the right rear leg 36.

Handlebars 26, 28 are positioned atop the right and left upper joints 38, 40. In an alternative embodiment, the stroller can have a single handlebar assembly extending between the left and right upper joints 38, 40. In one embodiment the stroller includes a single handle bar assembly with a parent tray, which may have, for example, any of the configurations disclosed in U.S. patent application Ser. No. 12/541,622.

Left and right front wheel assemblies 42, 44 are mounted at the bottom of the left and right front legs 30, 32, and left and right rear wheel assemblies 46, 48 are mounted at the bottom of the left and right rear legs 34, 36. In the embodiment shown, the front wheel assemblies 42, 44 have a single wheel configuration and rear wheel assemblies 46, 48 have a double wheel configuration, but it should be understood that any of the wheel assemblies 42, 44, 46, 48 can be provided with either a single or double wheel configuration.

As shown in FIGS. 1-4 the stroller 10 of the present invention includes a seat assembly 50 mounted to the frame 12. The seat assembly 50 includes a seat base 60, a seat back 62, and left and right seat adjustment plates 64, 66. The seat adjustment plates 64, 66 are preferably affixed to the left and right links 22, 24 and permit the seat back 62 to pivot with respect to the seat base 60 and lock into a selected pivotal position.

The seat back 62 includes a seat back frame 68 and the seat base includes a seat base frame 70. In the embodiment shown, the seat base frame 70 is formed by portions of links 22, 24 extending past the front legs 30, 32, but could also be formed by separate components. In use, the seat back frame 68 and the seat base frame 70 include fabric covers or panels to enclose or cover the frames 68, 70 or portions thereof and define a seat back front surface 94 and rear surface 95, and a seat base top surface 96 and bottom surface 97. For the sake of simplicity and in order to fully illustrate the working components of the invention, the seat back 62 and seat base 60 are shown without their respective fabric covers, and the front, rear, top and bottom surfaces are designated according to their positioning with respect to the seat back frame 68 and seat base frame 70.

Figure 4:
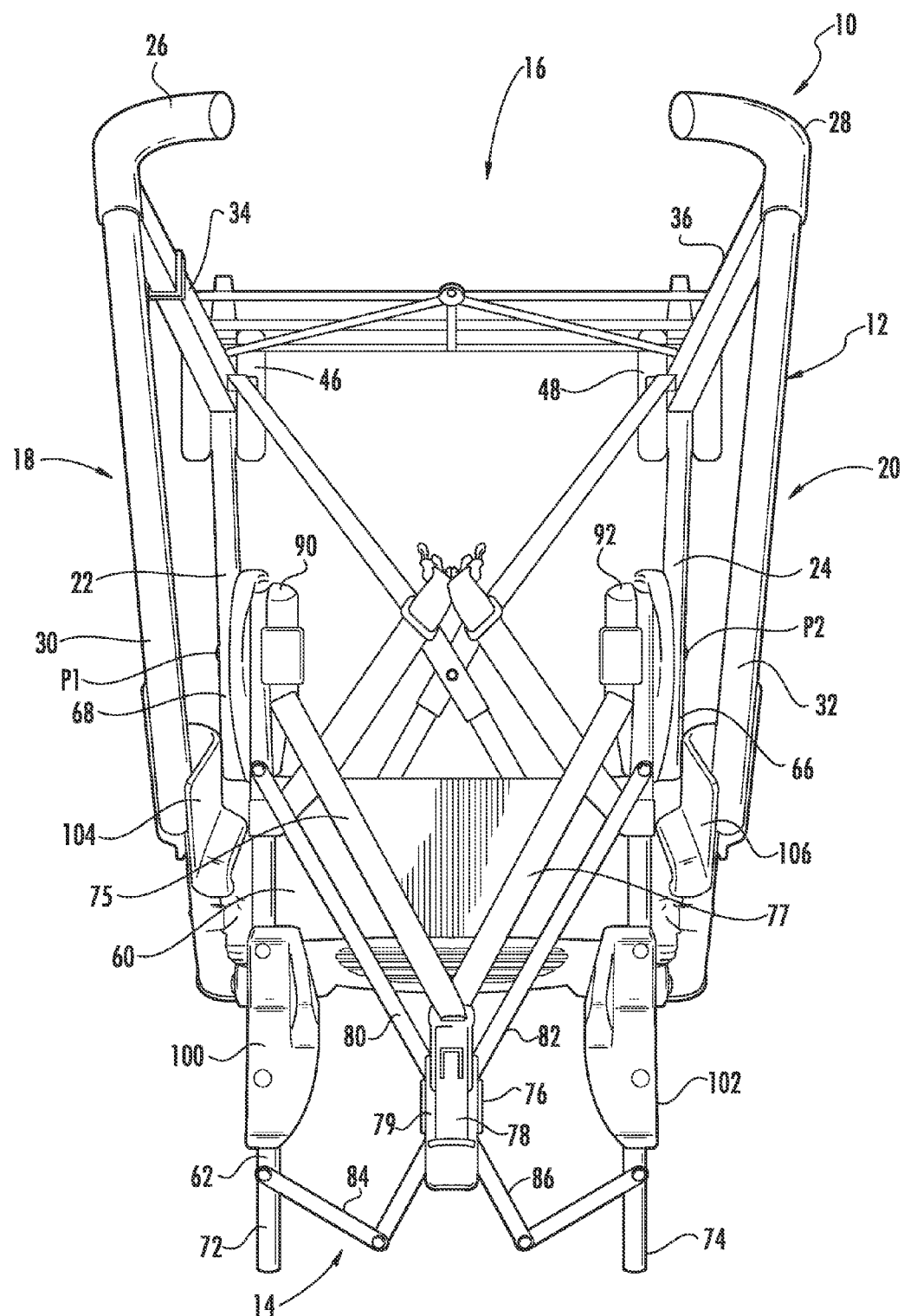
FIG. 4 is a top view of the stroller of FIG. 1, with the seat back positioned in the travel seat support position.
Figure 5:
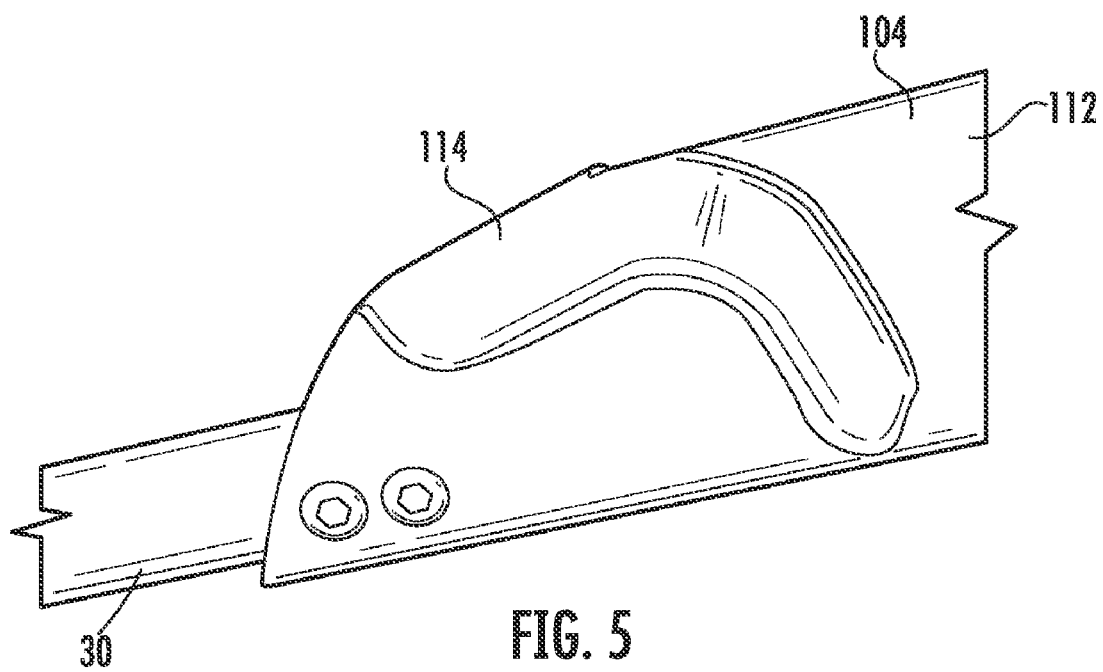
FIG. 5 is an enlarged detail of a rear travel seat mount of the stroller of FIG. 1.

The seat assembly 50 preferably includes a pivoting assembly of the type disclosed in U.S. Patent Pub. No. 2009/0243260, which is incorporated by reference herein as if fully set forth. As best shown in FIG. 4, the seat back frame 68 includes left and right seat frame members 72, 74 pivotally affixed to the left and right seat adjustment plates 64, 66 at pivot points P1 and P2. An operator control 76 including a fixed handle guide 79 and operating handle 78 is affixed between the seat frame members 72, 74 by a plurality of connectors 80, 82, 84, 86 extending between the seat frame members 72, 74. The operating handle 78 is slidably affixed within the fixed handle guide 79. Right and left straps 75, 77 connect the operating handle 78 to left and right projections 90, 92 engaged with the right and left seat adjustment plates 64, 66.

Figure 8:
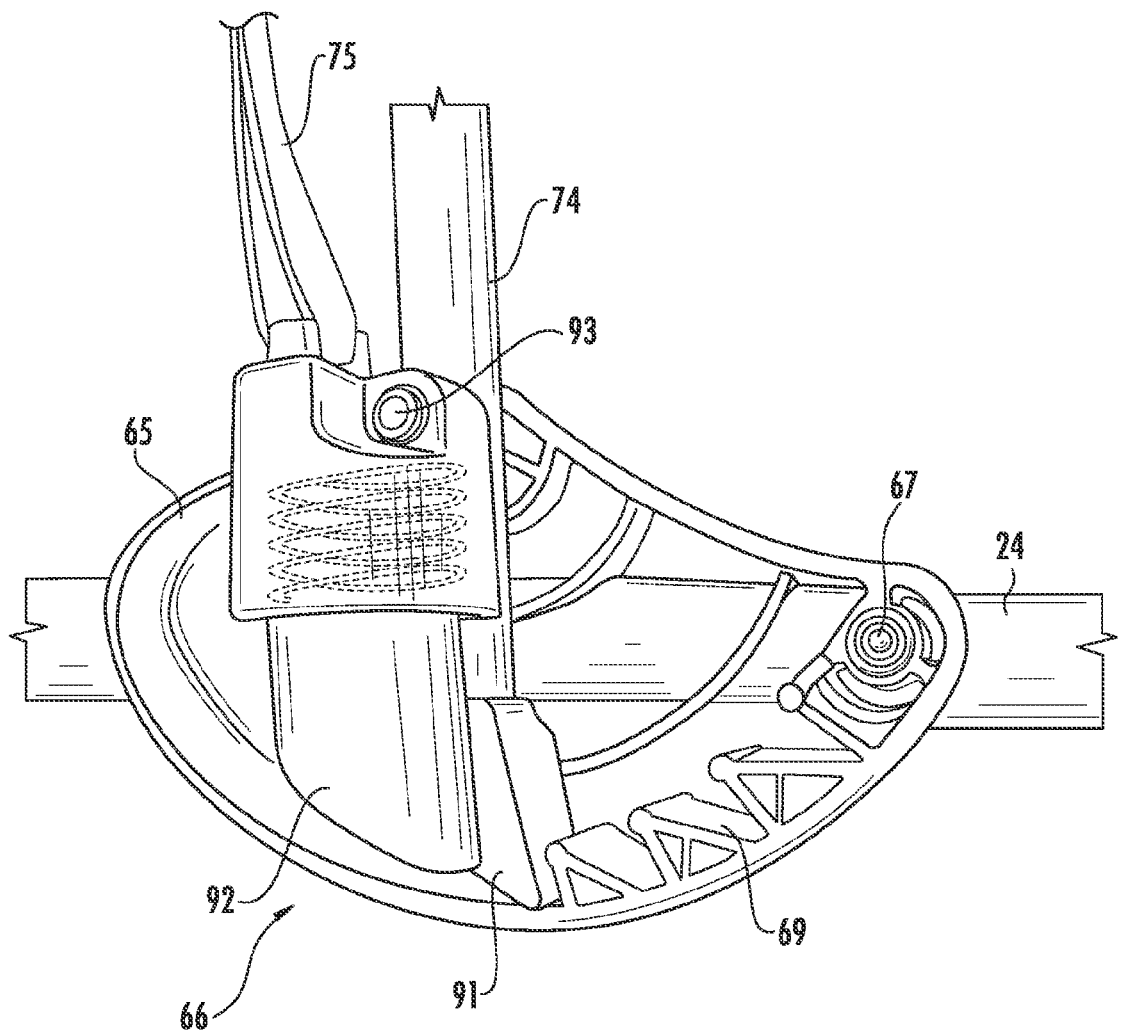
FIG. 8 illustrates the right seat adjustment plate of the stroller of FIG. 1.

The seat right adjustment plate 66 is shown in FIG. 8. While only the right adjustment plate is shown in detail, it should be understood that the left adjustment plate 68 is preferably a mirror image thereof. As shown, adjustment plate 66 is fixed to the right link 24 by a fastener 67 and features a plurality of detents 69. The projection 92 features an engaging surface 91 and is biased by a spring, or other suitable means, toward engagement with one of the plurality of detents 69. Right seat frame member 74 is pivotably mounted to the adjustment plate 66 by a pin 93, allowing the seat back 62 to adjustably pivot to a desired position.

To adjust the position of the seat back 62, the operating handle 78 is pulled upwards or in a direction towards the top of the seat back 62. The upwards movement of operating handle results in tensioning and upward movement of straps 75, 77, which transfer the upward force to projections 90, 92, disengaging the engaging surfaces 91 from the detents 69 of adjustment plates 66, 68. Once disengaged, the seat frame members 72, 74 are free to rotate relative to the adjustment plates 66, 68, allowing the entire seat back 62 to pivot. The release of operating handle 78 allows the projections 90, 92 to reengage the detents 69, setting a desired level of recline of the seat back 62.

While the seat pivoting assembly described above is preferred, it can take on other configurations as well, such as that disclosed in U.S. patent application Ser. No. 12/541,622.

Figure 3:
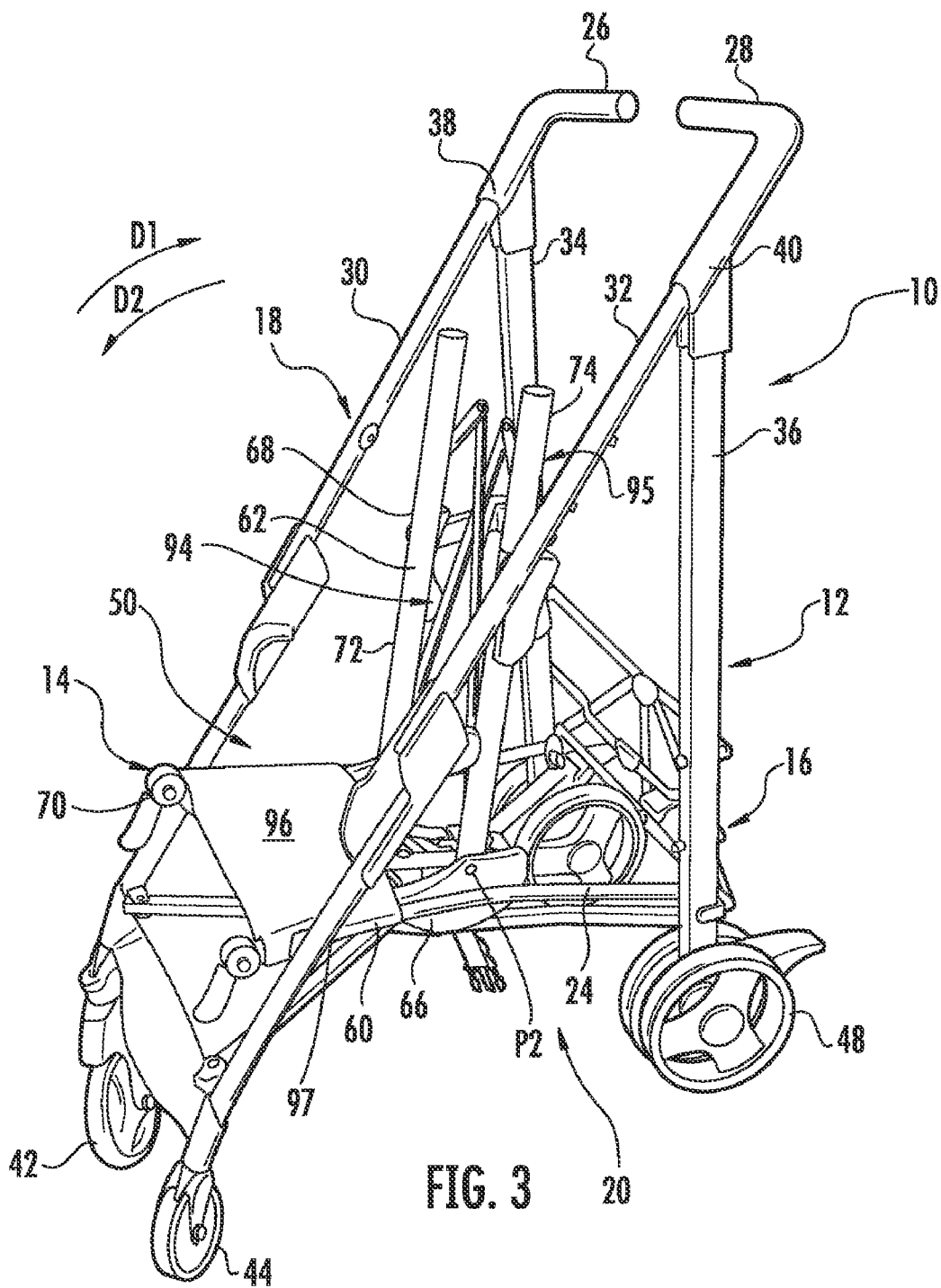
FIG. 3 is a perspective view of the stroller of FIG. 1, with the seat back positioned in a back support position.

The seat back 62 pivots in directions D1 and D2, shown in FIG. 3, between a travel seat support position (FIG. 1) in which the seat back 62 extends towards the front portion 14 of the frame 12 and is capable of supporting a child seat thereon, and at least one back support position in which the seat back 62 is substantially upright and the seat assembly 50 is suitable for seating a child therein (FIG. 3) or the seat back is in one of a plurality of reclined positions in which the seat back 62 extends towards the rear portion 16 of the frame 12. The projections engage the detents 69 when the seat back 62 is in the upright and reclined positions. When the seat back 62 is in the travel seat support position and seat frame members 72, 74 are pivoted forward, projections 90, 92 abut rear walls 65 of adjustment plates 66, 68.

As shown in FIG. 1, the travel seat 120 is supported between the front legs 30, 32 and the seat frame members 72, 74 when the seat back 62 is in the travel seat support position. The stroller 10 includes at least one travel seat support mount for retaining a travel seat thereon. The stroller 10 is preferably provided with left and right front mounts 100, 102 and left and right rear mounts 104, 106.

Figure 6:
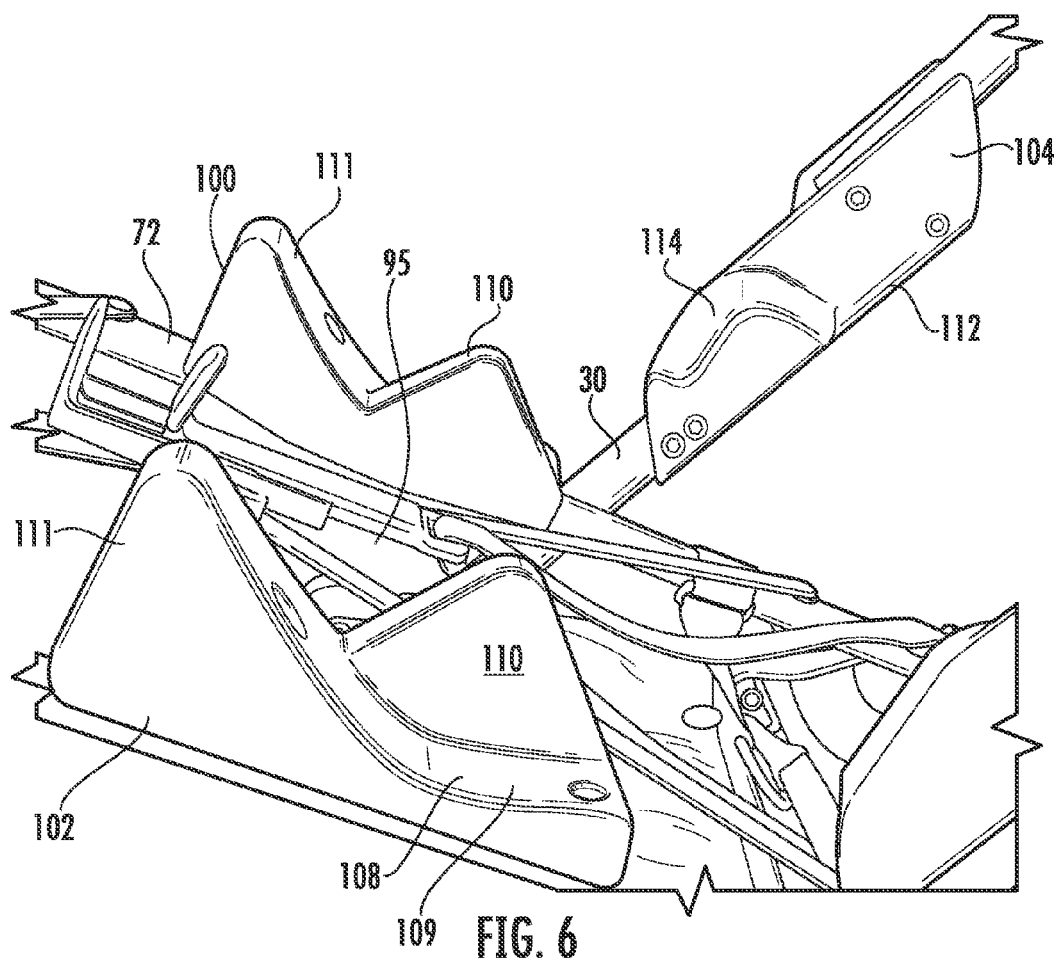
FIG. 6 is an enlarged detail showing the front travel seat mounts of the stroller of FIG. 1.
Figure 7:
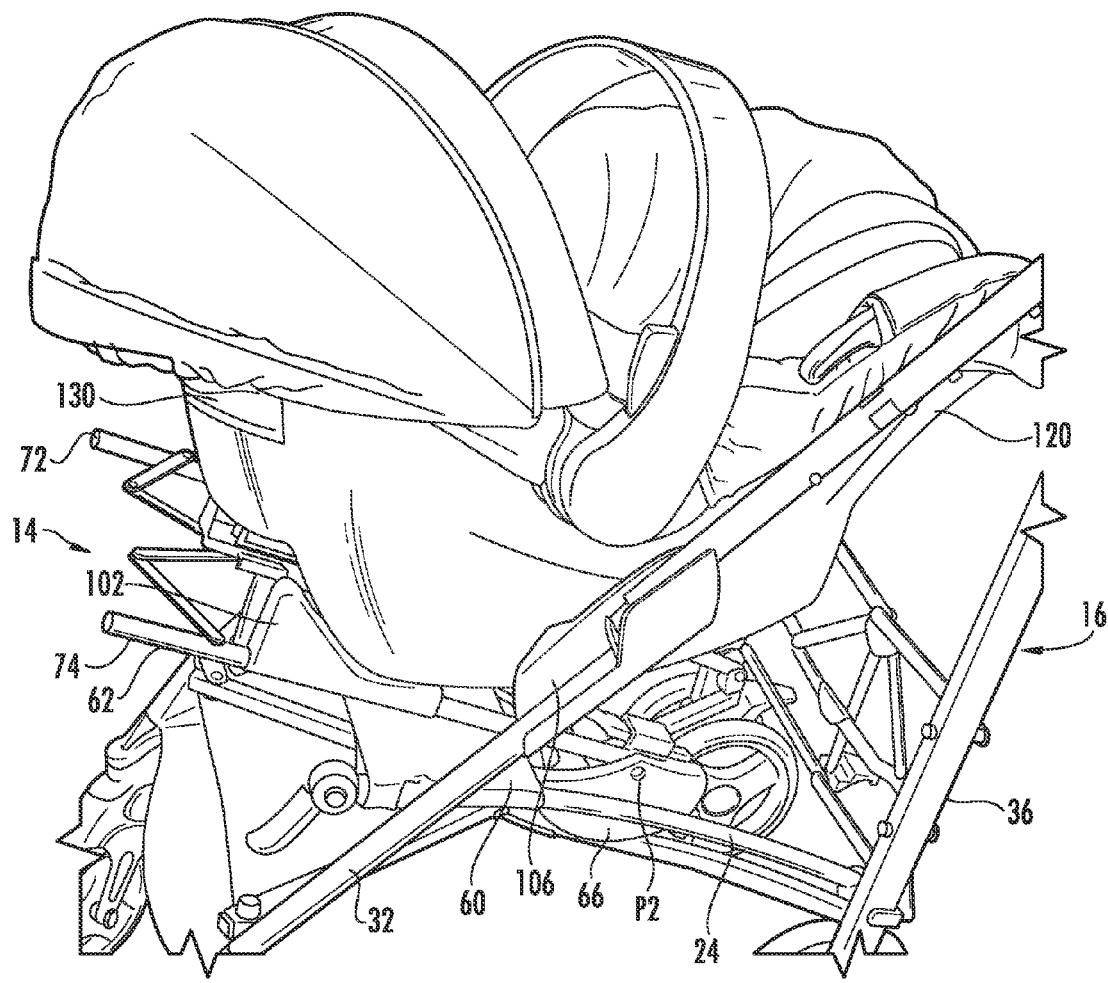
FIG. 7 is an enlarged detail of the stroller of FIG. 1, showing the front and rear travel seat mounts in detail with a travel seat mounted thereon.

The front mounts 100, 102 are shown in detail in FIG. 6. As shown, the front mounts 100, 102 are affixed on the left and right sides of the seat back. In the embodiment shown, the right front mount 102 is affixed to the right seat frame member 74 and the left front mount 100 is affixed to the left seat frame member 72. Both front mounts 100, 102 extend from the rear surface 95 of the seat back 62. Where a fabric cover is affixed over the seat back 62, it is preferably provided with openings that allow the front mounts 100, 102 to protrude therethrough. The angles of the legs are such that the front mounts 100, 102 are located forward of the rear legs 30, 32 when the seat back 62 is folded into the travel seat support position.

The right front mount 102 will be described in detail, but it should be understood that the left front mount 100 is preferably a mirror image thereof. The right front mount 102 is of a shape complementary to a bottom surface of the travel seat 120. The right front mount 102 includes a surface to support a complementary surface of the travel seat 120. In the embodiment shown, the mount 102 includes an outer supporting wall 108 and an inner projection 110. The supporting wall 108 includes a substantially flat base portion 109 disposed towards the rear 16 of the stroller frame 12 and a retaining portion 111 that curves upwardly from the base portion 109 and is disposed towards the front 14 of the stroller frame 12.

Figure 2:
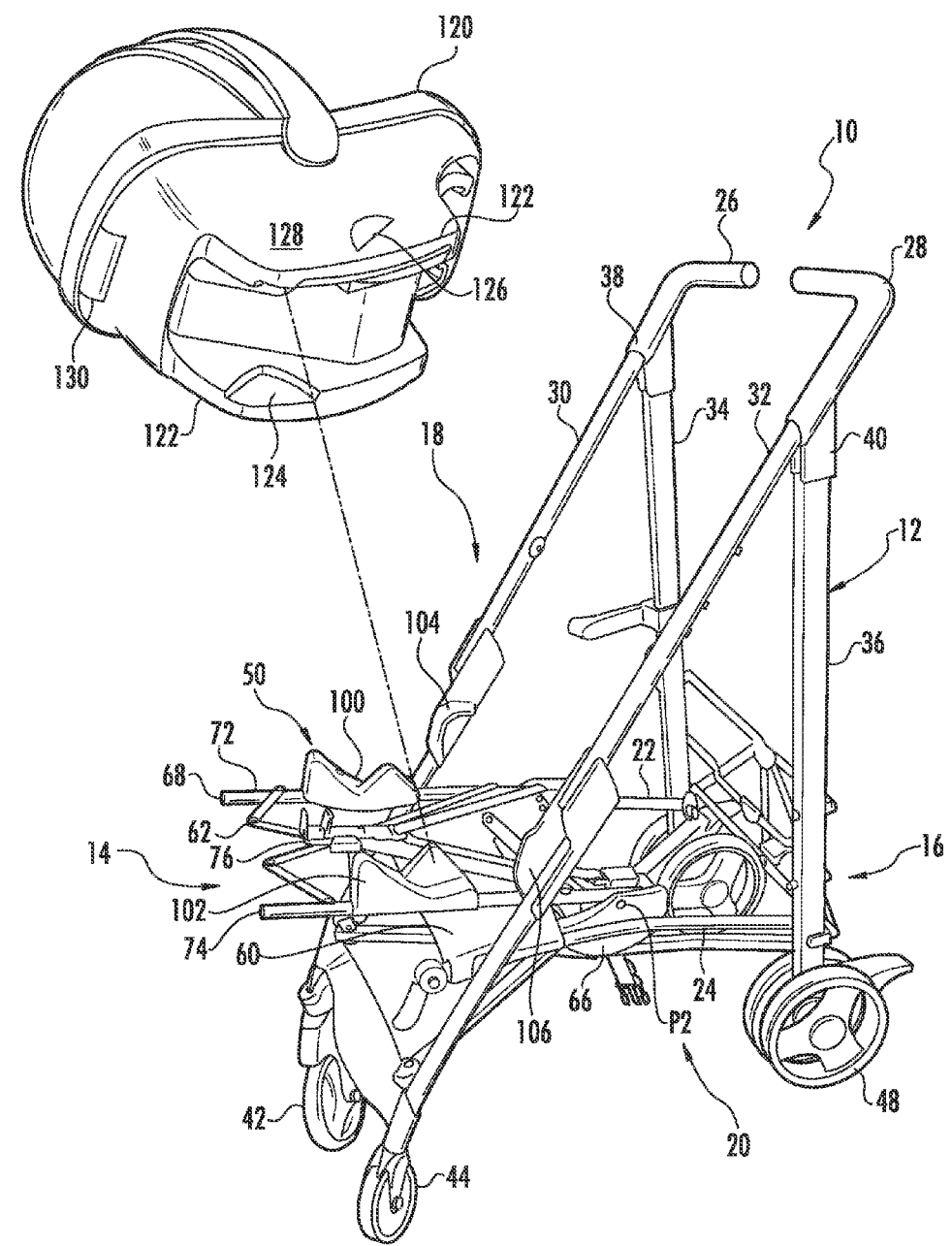
FIG. 2 is a perspective view of the stroller of FIG. 1, with the seat back positioned in a travel seat support position and a travel seat positioned for mounting on the stroller.

As shown in FIG. 2, the travel seat 120 includes outer ridges 122 on the bottom surface thereof. The ridges 122 rest on the outer supporting walls 108 of the front mounts 100, 102. The ridge 122 forms a convexly curved surface that rests on a concave upper surface formed by the base portion 109 and the retaining portion 111 of the outer supporting wall 108. The travel seat 120 further includes inner grooves 124 disposed between the outer ridges 122. In the embodiment shown, the inner grooves 124 are formed on inner side surfaces of the ridges 122. The inner projections 110 of the mounts 102, 104 are disposed between the outer supporting walls 108 and extend into the grooves 124 of the travel seat 120. The projection 110 shown in FIG. 6 is formed as a wall extending upwards from the outer supporting wall 108 and is of a shape complementary to an inner groove 124 of the travel seat 120. In the embodiment shown, the projection 110 and the inner groove 124 both have substantially triangular shapes, but these elements can take on other shapes as well.

As shown in FIG. 2, the left rear mount 104 is preferably affixed to the left front leg 30 and the right rear mount 106 is preferably affixed to the right front leg 32. The rear mounts 104, 106 are located rearward of the front mounts 100, 102 when the seat back 62 is folded forward into the travel seat support position. The rear mounts 104, 106 could alternatively be affixed to another portion of the frame 12 located rearward of the front mounts 100, 102 when the seat back 62 is in the travel seat supporting position.

The rear mounts 104, 106 are configured to engage complementary counterstructures of the travel seat 120. The left rear mount 104 is shown in detail in FIG. 5. While the left rear mount 104 is shown in detail, it should be understood that the right rear mount 106 is preferably a mirror image thereof. As shown, the left rear mount 104 includes an outer wall 112 and an inner arch 114. The outer walls 112 of the mounts abut side surfaces 128 of the travel seat 120. The arches 114 of the left and right rear mounts 104, 106 are disposed between the outer walls 112 and are shaped to complement a surface of the travel seat 120. The arch 114 of the mount 104 is configured to engage a retractable flipper 128 on a side surface of the travel seat 120. An actuating handle 130 is provided the travel seat 120 for retracting the flippers 126. When the flipper 128 is extended it fits beneath the arch 114 in the space between outer wall 112 and arch. The retractable flipper assembly of the travel seat 120 and preferably has the configuration described in U.S. Pat. No. 7,597,396. Alternatively, or in addition to the flipper assembly, indentations could be formed in the side surface 128 of the travel seat 120 having complementary surfaces configured to sit atop the arches 114.

When the travel seat 120 is mounted on the stroller 10 with the seat assembly 50 in the travel seat support position, the projections 110 of the front travel seat mounts 102, 104 engage the grooves 124 formed in the travel seat 120 and the ridges 122 of the travel seat 120 rest on the outer supporting walls 108. Engagement of projections 110 with the grooves 124 prevent lateral displacement of the travel seat 120 with respect to the stroller, while the retaining portions 111 of the outer supporting walls 108 prevent the travel seat 120 from moving in a direction towards the front 14 of the stroller 10. The outer walls 114 of the rear mounts 104, 106 further prevent lateral displacement of the travel seat 120 with respect to the stroller 10, while engagement of the arches 114 with flippers 126 prevent the travel seat 120 from moving laterally as well as in directions towards both the front 14 and rear 16 of the stroller.

While various methods, configurations, and features of the present invention has been described above and shown in the drawings, those of ordinary skill in the art will appreciate from this disclosure that any combination of the above features can be used without departing from the scope of the present invention. Accordingly, it is recognized by those skilled in the art that changes may be made to the above described methods and embodiments of the invention without departing from the broad inventive concept thereof. It is understood, therefore, that this invention is not limited to the particular methods and embodiments disclosed, but is intended to cover all modifications which are within the spirit and scope of the invention as defined by the appended claims and/or shown in the attached drawings.

While the stroller is illustrated in the drawings as a single stroller, one of ordinary skill in the art would understand that the present invention can also be used with other stroller configurations including, without limitation, a sit and stand stroller, a double or duo stroller, and a jogging stroller. In addition, the stroller can be a two-dimensional fold stroller, such as that disclosed in U.S. Patent Pub. No. 2005/0242549 or a three dimensional stroller, such as that disclosed in U.S. patent application Ser. No. 12/059,591.

What is claimed is:

1. A stroller comprising:
    a frame comprising at least one front leg, at least one rear leg, and at least one wheel mounted on each leg, the frame defining front and rear portions and right and left sides;
    a seat having a seat base and a seat back pivotally mounted to the frame, the seat back having a front surface, a rear surface, a top portion and a bottom portion; and
    at least one first travel seat mount affixed to the at least one front leg;
    the seat back is rotatable relative to the frame between at least one back support position wherein the seat back is substantially upright or in a reclined position and a travel seat support position wherein the top portion of the seat back extends towards the front portion of the frame and is capable of supporting a travel seat thereon such that the travel seat is associated with both the seat back and the at least one front leg.

2. The stroller of claim 1, further comprising at least one second travel seat mount affixed to the rear surface of the seat back.

3. The stroller of claim 1, wherein the stroller is capable of supporting a travel seat between the rear surface of the seat back and the at least one front leg when in the travel seat support position.

4. The stroller of claim 1, wherein the at least one first travel seat mount comprises a portion for engaging a retractable flipper of a travel seat.

5. The stroller of claim 2, wherein the at least one second travel seat mount comprises a surface complementary to a bottom surface of a travel seat, and the travel seat is supported on the rear surface of the seat back.

6. The stroller of claim 1 wherein the seat back is rotatable relative to the frame through a plurality of reclined positions in which the top portion of the seat back extends towards the rear portion of the frame.

7. A stroller comprising:
    a frame comprising at least one front leg, at least one rear leg, and at least one wheel mounted on each leg, the frame defining front and rear portions and right and left sides; and
    a seat having a seat base and a seat back pivotally mounted to the frame, the seat back having a front surface and a rear surface;
    at least one front travel seat mount affixed to the rear surface of the seat back;

the seat back is rotatable relative to the frame between at least one back support position and a travel seat support position wherein the at least one front travel seat mount is positioned forward of the at least one front leg such that the stroller is capable of supporting a travel seat between the at least one front travel seat mount and the at least one front leg such that the travel seat is associated with both the seat back and the at least one front leg.

8. The stroller of claim 7, further comprising at least one rear travel seat mount affixed to the at least one front leg, such that the stroller is capable of supporting a travel seat between the at least one front travel seat mount and the at least one rear travel seat mount when in the travel seat support position.

9. The stroller of claim 8, wherein the frame comprises right and left front legs and the at least one rear travel seat mount comprises a right rear travel seat mount affixed to the right front leg and a left rear travel seat mount affixed to the left front leg.

10. The stroller of claim 7, comprising two front travel seat mounts affixed to the rear surface of the seat back at opposite sides thereof.

11. The stroller of claim 10, wherein the seat back comprises left and right seat back members, and a respective one of each of the two front travel seat mounts is affixed to each of the seat back members.

12. The stroller of claim 7, wherein the at least one front leg extends at an upward angle from the front portion to the rear portion of the frame.

13. A travel system, comprising:
a travel seat; and
a stroller comprising:
a frame having at least one front leg, at least one rear leg, and at least one wheel mounted on each leg, the frame defining front and rear portions and right and left sides; and
a seat mounted to the frame and having a seat base and a seat back that pivots with respect to the seat base, the seat back having a front surface and a rear surface;
at least one travel seat mount affixed to at least one of the frame or the seat back;
wherein the travel system converts between a child seating configuration in which the seat back is in a back support position, and a travel seat supporting configuration in which the seat back is pivoted to a position extending towards the front portion of the frame and the child seat is supportable between the seat back and the at least one front leg such that the child seat is associated with both the seat back and the at least one front leg.

14. The travel system of claim 13, wherein the at least one front leg extends at an upward angle from the front portion to the rear portion of the frame.

15. The travel system of claim 14, wherein the frame comprises left and right front legs and the seat back comprises left and right seat back members, and the travel seat is supportable between the left and right front legs and the left and right seat back members when the travel system is in the travel seat supporting configuration.

16. The travel system of claim 15, wherein the at least one travel seat mount comprises a left front travel seat mount affixed to the left seat back member, a right front travel seat mount affixed to the right seat back member, a left rear travel seat mount affixed to the left front leg, and a right rear travel seat mount affixed to the right front leg.

17. The travel system of claim 13, wherein the at least one travel seat mount defines a shape complementary to a surface of the travel seat.

18. The travel system of claim 17, wherein the at least one travel seat mount comprises a left travel seat mount and a right travel seat mount, each having an outer supporting wall that supports a bottom surface of the travel seat, and an inner projection that engages a groove formed in the travel seat when the travel system is in the travel seat supporting configuration.

19. The travel system of claim 18, wherein the bottom surface of the travel seat comprises ridges extending along opposite edges thereof that form the bottom surfaces supported by the outer supporting walls and the grooves are formed in side surfaces of the ridges.

20. The travel system of claim 18, wherein the supporting walls each comprise a substantially flat base portion disposed towards the rear portion of the frame and an upwardly curved retaining portion disposed towards the front portion of the frame that supports a curved front portion of the surface of the travel seat when the travel system is in the travel seat supporting configuration.

21. The travel system of claim 18, wherein the left travel seat mount and the right travel seat mount are affixed to the rear surface of the seat back.

22. The travel system of claim 13, wherein the travel seat comprises at least one counterstructure that engages the at least one travel seat mount.

23. The travel system of claim 22, wherein the at least one counterstructure is a retractable fin that engages a portion of the at least one travel seat mount.

24. The travel system of claim 13, wherein the frame comprises right and left front legs and the at least one travel seat mount comprises a right travel seat mount affixed to the right front leg and a left travel seat mount affixed to the left front leg, the right and left travel seat mounts each comprising an outer wall that abuts a side surface of the travel seat when the travel system is in the travel seat supporting configuration.

* * * * *